(12) United States Patent
Russell

(10) Patent No.: US 10,317,991 B2
(45) Date of Patent: Jun. 11, 2019

(54) PIXEL ADJUSTING AT DISPLAY CONTROLLER FOR ELECTRONIC DISPLAY STABILIZATION

(71) Applicant: Google Inc., Mountain View, CA (US)

(72) Inventor: Andrew Ian Russell, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 14 days.

(21) Appl. No.: 15/386,328

(22) Filed: Dec. 21, 2016

(65) Prior Publication Data

US 2017/0228015 A1 Aug. 10, 2017

Related U.S. Application Data

(60) Provisional application No. 62/292,939, filed on Feb. 9, 2016.

(51) Int. Cl.
*G06F 3/12* (2006.01)
*G06F 3/01* (2006.01)
*G06T 1/60* (2006.01)
*G06T 19/00* (2011.01)
*G02B 27/01* (2006.01)
*H04N 13/04* (2006.01)

(52) U.S. Cl.
CPC .......... *G06F 3/012* (2013.01); *G02B 27/0179* (2013.01); *G06T 1/60* (2013.01); *G06T 19/006* (2013.01); *G02B 2027/0187* (2013.01); *H04N 13/044* (2013.01)

(58) Field of Classification Search
CPC .............................. G06F 3/012; G06T 19/006

USPC .................................................. 345/649–688
See application file for complete search history.

(56) References Cited

U.S. PATENT DOCUMENTS

| 5,696,533 | A | * | 12/1997 | Montgomery | ...... G06F 3/04842 345/545 |
| 5,754,186 | A | | 5/1998 | Tam et al. | |
| 7,002,604 | B1 | | 2/2006 | Barrus et al. | |
| 2001/0050686 | A1 | | 12/2001 | Allen | |
| 2005/0052394 | A1 | | 3/2005 | Waterman | |
| 2008/0231579 | A1 | | 9/2008 | Vasquez et al. | |
| 2010/0021141 | A1 | * | 1/2010 | Yamashita | ............. H04N 5/775 386/356 |
| 2015/0002542 | A1 | | 1/2015 | Chan et al. | |
| 2015/0029218 | A1 | * | 1/2015 | Williams | ............. G06T 19/006 345/633 |
| 2015/0235453 | A1 | * | 8/2015 | Schowengerdt | ...... G06T 19/006 345/633 |
| 2016/0246061 | A1 | | 8/2016 | Bickerstaff et al. | |

(Continued)

OTHER PUBLICATIONS

International Search Report and Written Opinion correlating to PCT/US2016/068026 dated Mar. 16, 2017, 11 pages.

(Continued)

*Primary Examiner* — Ryan R Yang

(57) ABSTRACT

The locations of pixels in a frame are adjusted at a display controller after the frame has been generated by a graphics processing unit (GPU) or other processor and provided to the display controller. The adjusting of the pixel locations therefore occurs as close as possible to a display panel in a display system, thereby supporting rapid changes to pixel positions.

20 Claims, 5 Drawing Sheets

(56) References Cited

U.S. PATENT DOCUMENTS

2016/0282619 A1    9/2016   Oto et al.
2016/0335806 A1    11/2016   Chan et al.

OTHER PUBLICATIONS

Lanbooij, M. and Ijsselsteijn, W., "Visual Discomfort and Visual Fatigue of Stereoscopic Displays: A Review", Journal of Imaging Science and Technology, 53(3), 2009, 14 pages.
Schild, J., et al., "Integrating Stereoscopic Video in 3D Games", Entertainment Computing, ICEC, 2011, 12 pages.
Sung, S., et al., "Display Driver with on-chip frame buffer and a scalable image compression engine", Design-Reuse, <https://www.design-reuse.com/articles/33274/display-driver-with-on-chip-frame-buffer-and-a-scalable-image-compression-engine.html>, Accessed Oct. 29, 2015, 6 pages.
International Preliminary Report on Patentability dated Aug. 23, 2018 for corresponding International Application No. PCT/US2016/068026, 8 pages.

* cited by examiner

PIXEL ADJUSTING AT DISPLAY CONTROLLER FOR ELECTRONIC DISPLAY STABILIZATION

BACKGROUND

Field of the Disclosure

The present disclosure relates generally to video processing and more particularly to electronic display stabilization.

Description of the Related Art

Virtual reality (VR) systems and augmented reality (AR) systems create an artificial, or partially artificial, environment using computer-generated three-dimensional (3D) imagery. A primary goal of VR and AR systems is to give a user a sense of "presence" in the created environment. This sense of presence is facilitated through the use of a display device that is integrated with the movements of the user. For example, some VR and AR systems employ a head mounted display (HMD) that provides separate left-eye and right-eye displays. The displays together present a stereoscopic, or 3D, representation of a scene in the represented world, where the presented scene reflects the user's relative perspective of the scene based on the user's current pose (that is, the location and orientation of the user's head relative to a reference coordinate frame for the depicted scene).

HMD-based VR and AR systems display 3D imagery as a sequence of display frames, each display frame rendered based on a corresponding detected head pose and persisting for a particular period of time. However, because of delays in processing the display frames, the user's head may have significantly rotated in the time between the initiation of the rendering of a frame and the display of the resulting rendered frame. As such, the imagery displayed at the HMD at a particular point in time may lag behind the user's head movements. This dissonance between the user's perceived orientation within a scene and the orientation of the perspective of the scene presented on the HMD can lead to user disorientation, or what is often referred to as "virtual reality sickness".

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-5 disclose techniques for adjusting the locations of pixels in a frame at a display controller after the frame has been generated by a graphics processing unit (GPU) or other processor and provided to the display controller. The adjusting of the pixel locations therefore occurs as close as possible to a display panel in a display system, thereby supporting rapid changes to pixel locations. These rapid changes can improve the efficacy of electronic display stabilization (EDS) in head mounted display (HMD) and other virtual reality systems. For example, adjustments to account for head movements of a user can be implemented rapidly, without waiting for generation of a new frame at the GPU or other processor.

A variety of techniques can be employed to shift, at the display controller, the locations of pixels in the frame. For example, some display technologies provide pixels to a display panel by addressing pixel values stored at a buffer. For such display technologies, the locations of the pixels in the frame can be adjusted by adding offsets to one or more address values as the buffer is addressed for display. For other display technologies, the pixels stored at the buffer are provided to the display panel by coupling columns of the buffer to display elements of the panel. For these display technologies, the pixels can be shifted by controlling a multiplexer to set which column is coupled to a particular set of display elements.

Figure 1:
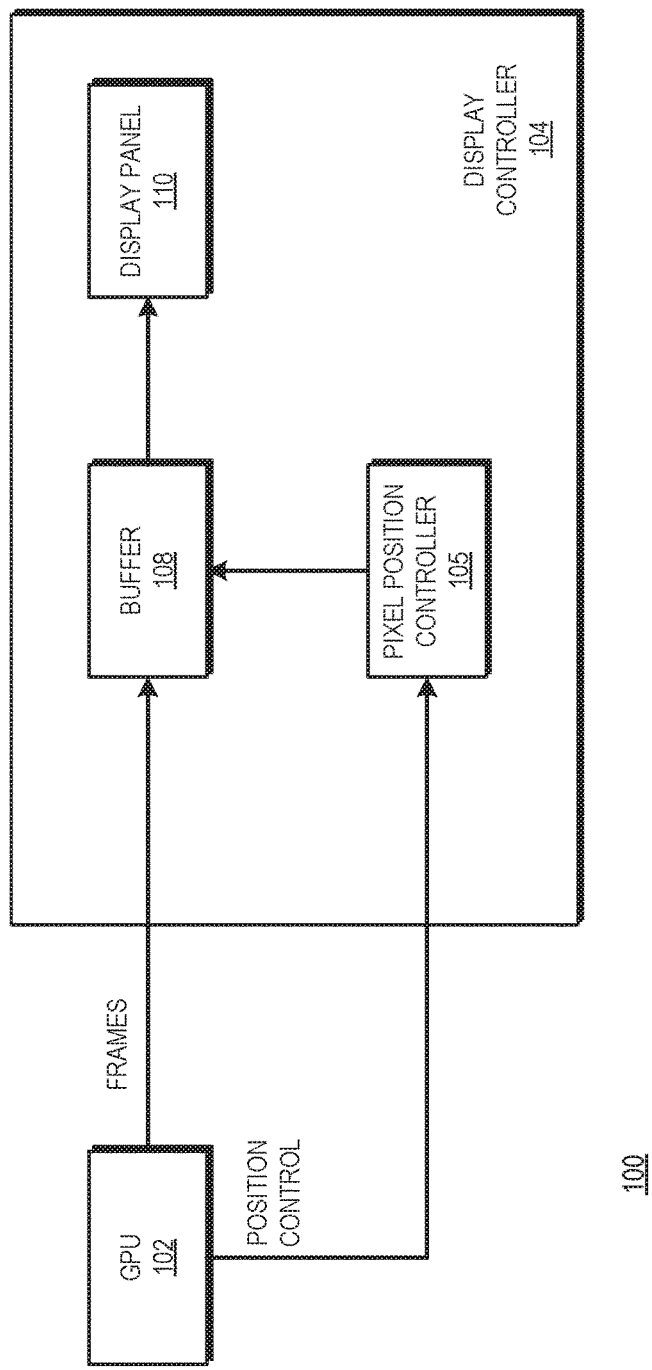
FIG. 1 is a block diagram of a display system including a display controller than can adjust pixel locations prior to display in accordance with some embodiments.

FIG. 1 illustrates a block diagram of a display system 100 in accordance with some embodiments. The display system 100 can be incorporated into any of a variety of electronic devices, such as a desktop or laptop computer, tablet, smartphone, automobile, and the like. For example, in at least one embodiment, described further below with respect to FIG. 5, the display system 100 is employed in an HMD system used to provide VR or AR functionality to a user, with the pixel adjustment techniques described herein supporting highly-responsive EDS techniques. In another embodiment, the display system 100 is employed as part of an electronic instruments display of an automobile to display, for example, information based on environmental conditions, with the pixel adjustment techniques described herein allowing for rapid updates of the display based on the detected conditions, motion of the automobile, or other factors.

The display system 100 includes a graphics processing unit (GPU) 102 and a display controller 104. The GPU 102 is generally configured to generate frames for display based on instructions and data received from a central processing unit (CPU) (not shown). Each frame is an array of pixel values representing an intensity of a corresponding pixel to be displayed. For convenience, and because there is a one-to-one correspondence between the pixel values and the pixel to be displayed, the pixel values are themselves referred to as pixels. The GPU 102 can generate the frames, based on the received instructions and data, using a variety of frame generation techniques, including primitive generation, raytracing, compositing of layers, and the like. As each frame is generated, the GPU 102 provides the frame to the display controller 104.

In addition, the GPU 102 generates location control signals to adjust the location of one or more of the pixels of a frame concurrently or previously provided to the display controller 104. The location control signals can be generated based on any of a variety of input sensors (not shown) or other information, and generated using any of a variety of process to achieve a desired effect in a displayed frame. For example, in at least one embodiment described further below with respect to FIG. 5, the location control signals can be generated by a conventional EDS process based on motion sensors detecting movement of a user's head or eyes.

In some embodiments, the process to generate the location control signals can change the location control signals at a higher rate than the GPU 102 can generate new frames and provide them to the display controller 104 for display. The location control signals can therefore be employed to make adjustments to a portion of a displayed frame rather more rapidly than such adjustments could be made by generating new frames at the GPU 102.

The display controller 104 includes a pixel position controller 105, a buffer 108, and a display panel 110. The display panel 110 includes a plurality of display elements, each display element configured to display a corresponding pixel based on an applied pixel value. Depending on the particular display technology, the display panel 110 can apply the pixel value to the display element in a variety of ways, such as application of a voltage based on the pixel value to one or more diodes, transistors, or other circuit elements of the display element. Accordingly, the display panel can implement any of a variety of display technologies, including liquid crystal display (LCD), liquid crystal on silicon (LCOS), light-emitting diode (LED), organic light-emitting diode (OLED), and the like.

The buffer 108 includes a plurality of entries, with each entry storing a pixel value for a pixel of a frame received from the GPU 102. In addition, the buffer 108 includes circuitry to apply the pixel values to display elements of the display panel 110 in order to display the frame. The circuitry employed by the buffer 108 to apply the pixel values depends on the display technology implemented by the display panel 110. For some display panel technologies, the entries of the buffer 108 are individually addressable, and the buffer 108 applies the pixel values to the display elements by addressing the entries in a specified sequence, such as a sequence indicated by a stored address list. For other display technologies, the buffer 108 applies columns of the entries to corresponding sets of display elements of the display panel 110.

The pixel position controller 105 is a module including circuitry configured to adjust the position of one or more pixels of the frame stored at the buffer 108 based on the position control signals generated by the GPU 102. By adjusting the pixels of the frame, the pixel position controller adjusts how the frame is displayed at the display panel 110. The pixel position controller 105 can shift the location of the pixels in any of a variety of ways, depending in part on how the buffer 108 applies the pixel values to display elements of the display panel 110. For example, in some embodiments the pixel position controller 105 can shift the location of a pixel by moving the pixel value for the pixel from one entry of the buffer 108 to a different entry. In other embodiments the pixel position controller 105 can shift the location of a pixel by changing the addresses used to access the buffer 108 to display a frame, thereby changing the correspondence between one or more entries of the buffer 108 and the display panel 110. In still other embodiments the pixel position controller 105 can change the locations of one or more pixels by controlling operation of a multiplexer to change which column of the buffer 108 is applied to a set of display elements of the display panel 110.

In operation, the GPU 102 generates, in sequence, frames for display and provides them to the display controller 104, which stores each received frame at the buffer 108. The buffer 108 applies the stored pixel values of the frame to the display panel 110, thereby displaying the frame. In addition, the GPU 102 generates location control signals to adjust the location of one or more pixels of the frame stored at the buffer 108. Based on the location control signals, the pixel position controller 105 adjusts the location of one or more pixels of the frame, thereby changing how the frame is displayed at the display panel 110. In some embodiments, the display controller 100 can change the position control signals, and make corresponding adjustments to pixel locations at the display controller 104, much faster than the GPU 102 can generate frames. Accordingly, by using the pixel position controller 105 to adjust pixel locations, the display controller 100 can make rapid adjustments to the frame displayed at the display panel 110, thereby supporting improved electronic display stabilization and other functionality.

Figure 2:
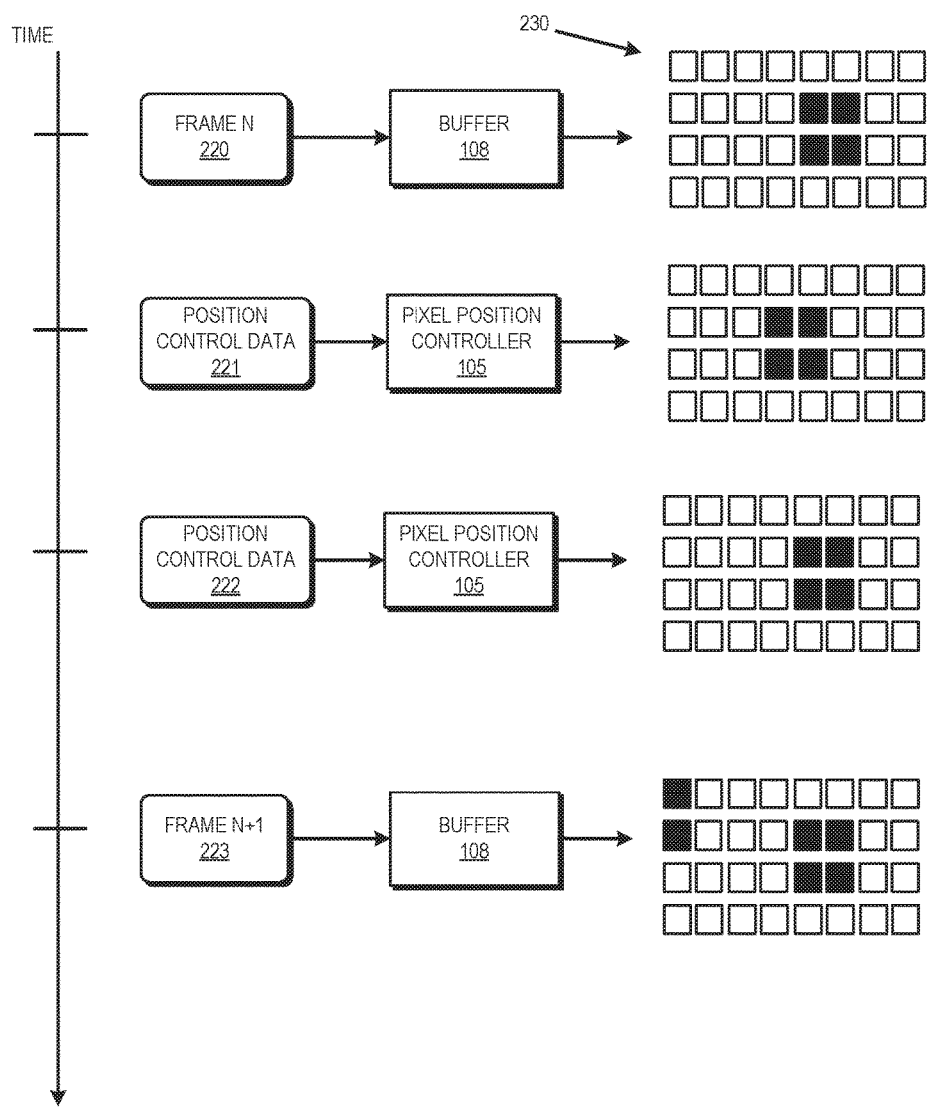
FIG. 2 is a block diagram illustrating an example of the display system of FIG. 1 adjusting pixel locations prior to display in accordance with some embodiments.

FIG. 2 illustrates an example of the display controller 104 adjusting pixel locations at a displayed frame in accordance with some embodiments. FIG. 2 depicts a sequence of events at the display controller 104 along a timeline. In the depicted example, the display panel 110 includes an 8×4 array 230 of display elements, each display element corresponding to a pixel. For purposes of description, the display elements will be referred to according to their coordinate position in the array 230, with position (0,0) located at the top left and position (7,3) located at the bottom right of the array 230. In addition, for purposes of the example of FIG. 2, the display elements of the array 230 can display one of two colors, black or white, based on the pixel value applied to the display element. However, it will be appreciated that the techniques described herein can be applied to color display panels.

In the illustrated example, at time 201 the GPU 102 provides a frame 220, designated "FRAME N", to the display controller 104, which stores the frame 220 at the buffer 108. The buffer 108 applies the pixel values of the frame 220 to the display panel 110. As illustrated, this results in the display elements at locations (4,2), (5,2), (4,3), and (5,3) of the array 230 displaying black, with the remaining display elements of the array 230 displaying white. At time 202 the GPU 102 provides position control signals 221 to the pixel position controller 105, instructing the pixel values for locations (4,2), (5,2), (4,3), and (5,3) to be shifted one pixel to the left. In response, the pixel position controller 105 changes the location of the pixels of the frame 220 stored at the buffer 108, so that the display elements at locations (3,2), (4,2), (3,3), and (4,3) display black, and the other pixels of the array 230 display white. Thus, the location of the black pixels is shifted at the display controller 104, without generation of a new frame by the GPU 102.

At time 203, At time 202 the GPU 102 provides position control signals 222 to the pixel position controller 105, instructing the pixel values for locations (3,2), (4,2), (3,3), and (4,3) to be shifted one pixel to the right, thus returning the black pixels to their original location. In response, the pixel position controller 105 changes the position of the pixels of the frame 220 stored at the buffer 108, so that the display elements at locations (4,2), (5,2), (4,3), and (5,3) display black, and the other pixels of the array 230 display white.

At time 204 the GPU 102 generates a frame 223, designated "FRAME N+1" to indicate that it is the next frame generated by the GPU 102 after FRAME N. The display controller 104 stores the frame 223 at the buffer 108, which applies the pixel values of the frame 223 to the display elements of the display panel 110. As illustrated, this results in the display elements at locations (0,0), (0,1), (4,2), (5,2), (4,3), and (5,3) displaying black, with the other display elements of the array 230 displaying white. Thus, in the example of FIG. 2, the pixel position controller 105 shifts locations of pixels being displayed between generation of frames by the GPU 102. This allows for flexible and rapid update of pixel locations for EDS and other applications. For example, in at least one embodiment the black pixels in the example of FIG. 2 represent a VR object displayed at an HMD. As the user's head moves, the pixel location controller 105 can make commensurate adjustments in the displayed location of the object rapidly, improving the immersiveness of the VR application.

Figure 3:
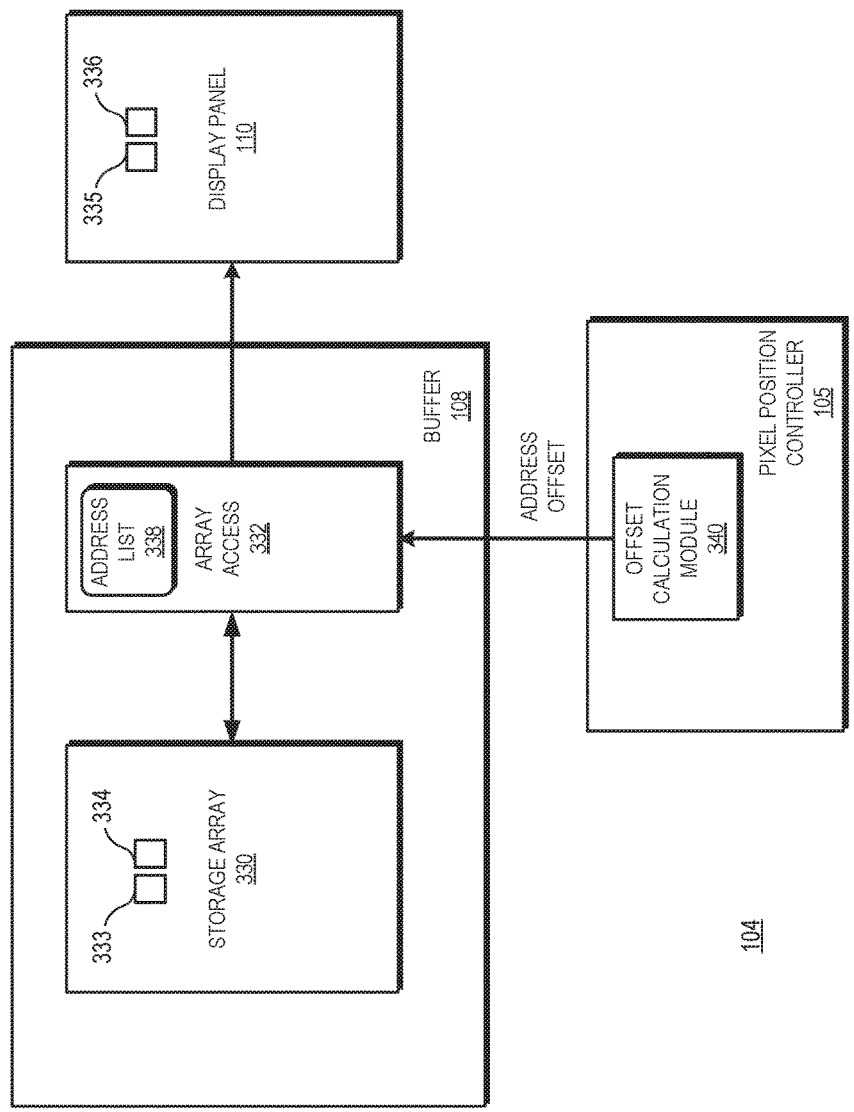
FIG. 3 is a block diagram of at least one embodiment of the display controller of FIG. 1, wherein the display controller adjusts pixel locations by adjusting memory addresses to access a buffer.

FIG. 3 illustrates the display controller 104 in accordance with some embodiments. In the illustrated example of FIG. 3, the buffer 108 includes a storage array 330 and an array access module 332. The storage array 330 includes a plurality of entries (e.g., entries 333 and 334) that each store a pixel value for a pixel of the frame stored at the buffer 108. Each of the entries is associated with a different unique address that can be used to access the entry. The array access module 332 includes circuitry configured to access the entries of the storage array 330 and apply the pixel values stored each entry to a corresponding display element (e.g., display elements 335, 336) of the display panel 110. In at least one embodiment, the array access module 332 applies a pixel value by addressing a storage entry, identifying the display element corresponding to the entry based on an address list 338, retrieving the pixel value from the addressed entry, translating the pixel value to one or more voltages, and applying the one or more voltages to one or more nodes of the identified display element.

In the example of FIG. 3, the pixel position controller 105 includes an offset calculation module 340 to calculate address offsets for one or more of the addresses of the storage array based on the received location control signals. The offset calculation module 340 provides the address offsets to the array access module 332, which combines the offsets with the corresponding addresses when addressing the storage array 330. The pixel position controller 105, in conjunction with the array access module 332, thereby changes the position of one or more pixels as they are displayed at the display panel 110.

To illustrate via an example, the address list 338 may be configured so that, in the absence of any offsets, the pixel value at entry 333 of the storage array 330 is applied to display element 335 of the display panel 110, and entry 334 is applied to display element 336. Thus, the pixel at display element 335 can be shifted one pixel to the right by addressing entry 333, rather than entry 334, for display element 336. Accordingly, to shift the pixel to the right, the offset calculation module calculates an offset for the address corresponding to entry 334, so that it is translated to the address for entry 333 when the array access module accesses the storage array 330. Further, the offset can be combined with the one or more addresses using relatively simple and fast adder circuitry, so that adjustments can be made to the locations of pixels without significantly impacting the frequency at which frames are displayed at the display panel 110.

Figure 4:
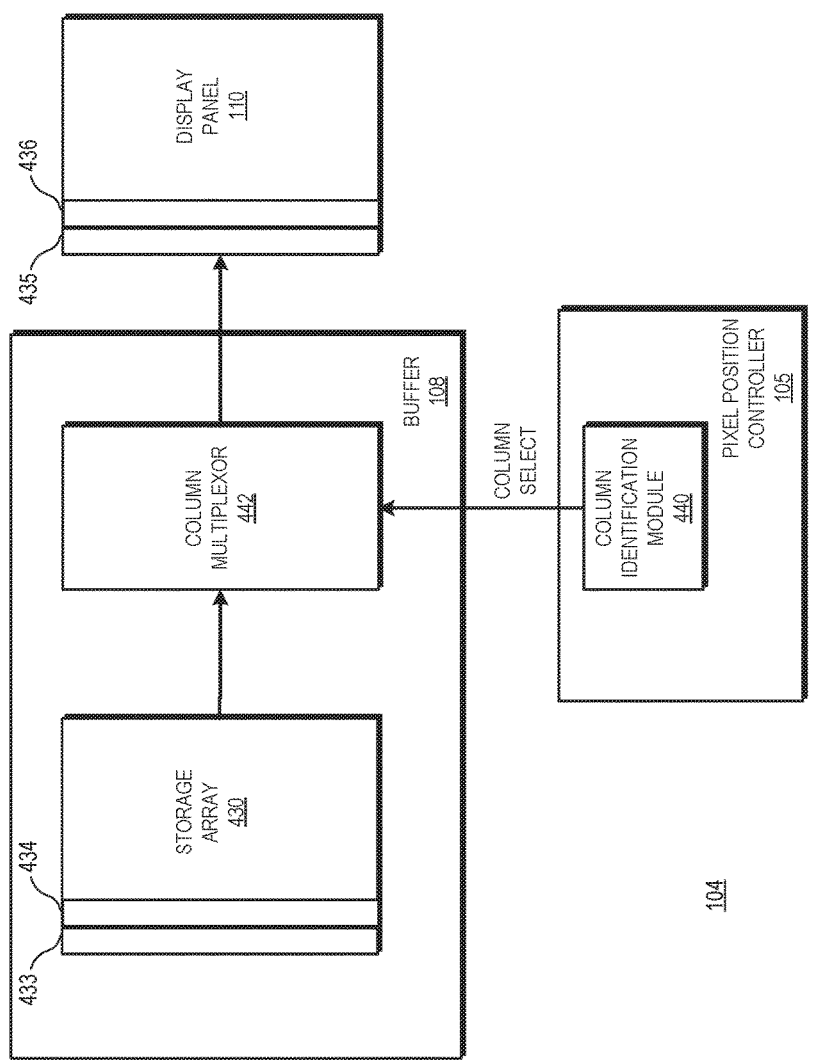
FIG. 4 is a block diagram of at least one other embodiment of the display controller of FIG. 1, wherein the display controller adjusts pixel locations by multiplexing columns of a buffer coupled to a display.

FIG. 4 illustrates the display controller 104 in accordance with some embodiments. In the example of FIG. 4, the buffer 108 includes a storage array 430 and a column multiplexer 442. The storage array 430 includes a plurality of columns (e.g., columns 433 and 434), with each column including multiple storage entries that each store a pixel value for a pixel of the frame stored at the buffer 108. In the illustrated example, the display panel 110 includes multiple columns (e.g., columns 435 and 436), with each column including a corresponding set of display elements. The multiplexer 442 includes circuitry configured to apply, based on received control signals, the pixel values at each column of the storage array 430 to the display elements of a different corresponding column of the display panel 110. Thus, for example, under one state of received control signals the multiplexer 442 applies the pixel values of column 433 to corresponding display elements of column 435 of the display panel 110, and applies the pixel values of column 434 to corresponding display elements of column 436.

In the example of FIG. 4, the pixel position controller 105 includes a column identification module 440 to identify, based on the received position control signals, correspondences between columns of the storage array 430 and columns of the display panel 110. Based on the identified correspondences, the column identification module generates control signals for the column multiplexer 442 so that the pixel values in each column of the storage array 430 are applied to the corresponding column of the display panel 110. The pixel position controller 105, in conjunction with the column multiplexer 442, can adjust the location of one or more pixels as they are displayed at the display panel 110.

To illustrate via an example, under one state of control signals the multiplexer 442 applies the pixel values of column 433 to corresponding display elements of column 435 of the display panel 110, and applies the pixel values of column 434 to corresponding display elements of column 436. To shift the pixels displayed at column 436 to the left, the column identification module 440 changes the control signals so that the pixel values of column 434 are applied to column 435 of the display panel 110. It will be appreciated that while in the example of FIG. 4 pixel values are applied on a column-by-column basis, in other embodiments the pixel values may be applied by the multiplexer 442 according to a different scheme, such as by row, by tile (e.g. an N×N tile of pixel values) and the like, to support different granularities of pixel location adjustments.

Figure 5:
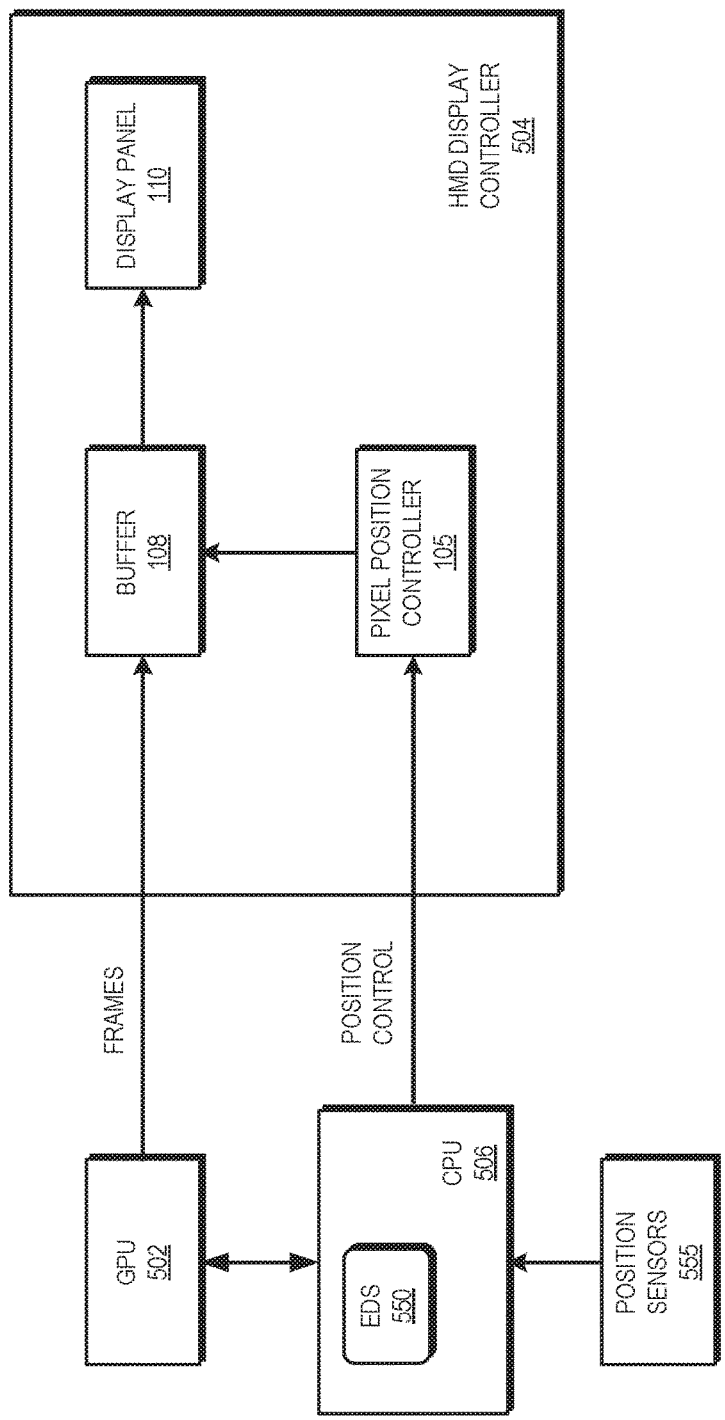
FIG. 5 is a block diagram of a head mounted display system employing a display controller similar to that of FIG. 1 in accordance with some embodiments.

FIG. 5 depicts a block diagram of an HMD system 500 that can adjust pixel locations at a display controller 504 in accordance with some embodiments. The display controller 504 includes the buffer 108, display panel 110, and pixel position controller 105, each of which operates similarly to the correspondingly numbered modules of FIG. 1. In addition, the HMD system 500 includes a GPU 502, a CPU 506, and position sensors 555. In operation the CPU 506 executes one or more VR or AR applications that provide commands and data to the GPU 502. Based on the commands and data, the GPU 502 generates frames for display, and provides the frames to the display controller 504. The display controller 504 stores the received frames at the buffer 108, which applies the pixel values of the stored frame to the display panel 110, thereby displaying the frame.

In at least one embodiment, the VR or AR application generates the data and commands provided to the GPU 102 based at least in part on the current pose (that is, position and rotational orientation) of the HMD (and thus the user's head) as indicated by the position sensors 555 and relative to a reference coordinate frame. Accordingly, the frames generated by the GPU 502 reflect imagery of a scene from a perspective associated with that pose. The displayed imagery may be completely computer-generated (that is, VR imagery), or the imagery may be a combination of imagery captured of the local environment (e.g., imagery captured via one or more image sensors mounted on the HMD) and an AR overlay that is rendered so as to reflect the current user pose.

As the HMD is mounted on the user's head, or otherwise constrained so as to move in concert with the user's head, the HMD is subject to considerable movement around one or more axes (e.g., the depicted x, y, and z axes) during operation. This movement, when combined with the rendering and display latency of the GPU 502, can result in substantial user disorientation unless otherwise mitigated. Accordingly, the CPU 506 executes an electronic display stabilization (EDS) process 550 to warp the frame stored at the buffer 108 by adjusting pixel positions of the frame at the display controller 504. Based on the warp, the EDS process 550 identifies adjustments to pixel positions that implement the warp, and generates position control signals to effectuate the adjustments. The pixel position controller 105 receives the position control signals and adjusts the positions of one or more pixels of the frame stored at the buffer 108, as described above. The EDS process 560 can thereby apply warps to the displayed frames between generation of frames at the GPU 502. This allows the EDS process 560 to apply more warps and to have those warps applied to a displayed frame quickly, improving the efficacy of the EDS process 560.

In at least one embodiment, the EDS process 560 generates and applies the EDS warp using the techniques described in U.S. Patent Application Ser. No. 62/174,602 , entitled "Electronic Display Stabilization for Head Mounted Display" and filed on Jun. 12, 2015, the entirety of which is incorporated by reference herein. For example, in one embodiment the warping process employed by the EDS process 560 includes the determination, based on the head rotation indicated by differences in pose information, of a homography rotation from an original head pose an updated head pose as determined by the EDS process 560, and the application of this homography rotation (in the form of a linear transform). Further, eyepiece lenses of the HMD system (not shown) can introduce optical distortion, as well as chromatic aberrations, or color separation, due to different wavelengths of light separating when refracted through the eyepiece lenses, and thus the warping process employed by the EDS process 560 may compensate for one or more of optical distortion, chromatic aberrations, darkening toward the edges of the lenses, composite textures from other sources, and the like. The interim warping provided by the homography rotation may be implemented by applying the homography rotation to look-up table (LUT) values utilized by the distortion/chromatic aberration correction processes to introduce compensatory distortion (or "predistortion"), and then applying the resulting modified LUT values to the frame so as to concurrently implement both the homography rotation and the other correction/compensation processes.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   receiving at a display controller a first frame for display, the first frame generated based on a first pose of a user;
   displaying the first frame at the display controller;
   after displaying the first frame, adjusting at the display controller, based on movements of the user to a second pose, locations of pixels of a first set of pixels of the first frame to generate a first modified frame; and
   displaying the first modified frame at the display controller.

2. The method of claim 1, wherein receiving the first frame comprises receiving the first frame from a processor, and further comprising:
   receiving control signaling from the processor; and wherein adjusting the locations of the first set of pixels comprises adjusting the locations of the first set of pixels based on the control signaling.

3. The method of claim 1, further comprising:
receiving at the display controller a second frame for display;
adjusting at the display controller locations of pixels of a second set of pixels of the second frame to generate a second modified frame; and
displaying the second modified frame at the display controller.

4. The method of claim 3, wherein the locations of the second set of pixels in the second frame are different than the locations of the first set of pixels in the first frame.

5. The method of claim 3, wherein adjusting the first set of pixels comprises applying a first transform to the first set of pixels and adjusting the second set of pixels comprises applying a second transform to the second set of pixels, the second transform different from the first transform.

6. The method of claim 1, further comprising:
storing the first frame at a buffer of the display controller; and
wherein adjusting the locations of the first set of pixels comprises applying a memory address offset to memory accesses for the first set of pixels.

7. The method of claim 1, further comprising:
storing the first frame at a buffer of the display controller; and
wherein adjusting the locations of the first set of pixels comprises multiplexing outputs of segments of the buffer to shift the locations of the first set of pixels.

8. A method implemented at a head mounted display (HMD) comprising:
receiving at a display controller a first frame for display, the first frame generated based on a first pose of the HMD;
displaying the first frame at the HMD;
after displaying the first frame, based on identified motion of the HMD, adjusting at the display controller positions of a first set of pixels of the first frame to generate a first modified frame; and
displaying the first modified frame at the HMD.

9. The method of claim 8, wherein receiving the first frame comprises receiving the first frame from a processor, and further comprising:
receiving control signaling from the processor; and
wherein adjusting the positions of the first set of pixels comprises adjusting the positions of the first set of pixels based on the control signaling.

10. The method of claim 8, further comprising:
receiving at the display controller a second frame for display;
adjusting at the display controller positions of a second set of pixels of the second frame to generate a second modified frame; and
displaying the second modified frame.

11. The method of claim 10, wherein the positions of the second set of pixels in the second frame are different than the positions of the first set of pixels in the first frame.

12. The method of claim 8, further comprising:
storing the first frame at a buffer of the display controller; and
wherein adjusting the positions of the first set of pixels comprises applying a memory address offset to memory accesses for the first set of pixels.

13. The method of claim 8, further comprising:
storing the first frame at a buffer of the display controller; and
wherein adjusting the positions of the first set of pixels comprises multiplexing outputs of segments of the buffer to shift the positions of the first set of pixels.

14. A display controller comprising:
a buffer to store a first frame for display, the first frame generated based on a first pose of a user's head;
a display panel to display the first frame; and
a pixel position adjustment module to, after display of the first frame, adjust positions of a first set of pixels of the first frame to generate a first modified frame based a movement of the user's head to a second pose.

15. The display controller of claim 14, wherein:
the display controller is to receive the first frame from a processor;
the display controller is to receive control signaling from the processor; and
the pixel position adjustment module is to adjust the first set of pixels based on the control signaling.

16. The display controller of claim 14, wherein:
the buffer is to store a second frame for display;
the pixel position adjustment module is to adjust positions of a second set of pixels of the second frame to generate a second modified frame; and
the display panel is to display the second modified frame.

17. The display controller of claim 16, wherein the positions of the second set of pixels in the second frame are different than the positions of the first set of pixels in the first frame.

18. The display controller of claim 16, wherein the pixel position adjustment module is to adjust the first set of pixels comprises by applying a first transform to positions of the first set of pixels and to adjust the second set of pixels comprises by applying a second transform to the second set of pixels, the second transform different from the first transform.

19. The display controller of claim 14, wherein the pixel position adjustment module comprises:
an address adjustment module to adjust the positions of the first set of pixels by applying a memory address offset to memory accesses for the first set of pixels.

20. The display controller of claim 14, wherein the pixel position adjustment module comprises
a multiplexer to adjust the positions of the first set of pixels by multiplexing outputs of segments of the buffer applied to the display panel.

* * * * *